US008561658B2

(12) United States Patent
Kightly

(10) Patent No.: US 8,561,658 B2
(45) Date of Patent: Oct. 22, 2013

(54) FUEL RECOVERY SYSTEM AND METHOD

(76) Inventor: Chris Kightly, San Diego, CA (US)

( * ) Notice: Subject to any disclaimer, the term of this patent is extended or adjusted under 35 U.S.C. 154(b) by 356 days.

(21) Appl. No.: 12/860,677

(22) Filed: Aug. 20, 2010

(65) Prior Publication Data

US 2012/0042964 A1 Feb. 23, 2012

(51) Int. Cl.
*B65B 3/04* (2006.01)
(52) U.S. Cl.
USPC ............... 141/330; 141/86; 141/98; 141/231; 141/351; 184/1.5; 184/106
(58) Field of Classification Search
USPC ............. 141/94, 98, 231–233, 329–330, 351, 141/86–88; 184/1.5, 106
See application file for complete search history.

(56) References Cited

U.S. PATENT DOCUMENTS

| | | | |
|---|---|---|---|
| 1,582,399 A | | 4/1926 | Helander |
| 1,994,844 A | * | 3/1935 | Vahle et al. ............ 184/1.5 |
| 4,230,002 A | | 10/1980 | Skidmore |
| 4,274,645 A | * | 6/1981 | Ferguson et al. .......... 280/47.26 |
| 4,883,102 A | * | 11/1989 | Gabrielyan et al. .......... 141/98 |
| 5,301,724 A | * | 4/1994 | Maxwell ........................ 141/98 |
| 5,375,862 A | | 12/1994 | Sirianno |
| 5,878,799 A | * | 3/1999 | Hannick ................. 141/351 |
| 5,921,262 A | * | 7/1999 | Campbell ..................... 137/1 |
| 5,921,292 A | * | 7/1999 | Fouts ............................ 141/98 |
| 6,640,844 B1 | * | 11/2003 | Beagell et al. ............... 141/65 |
| 6,860,300 B1 | * | 3/2005 | Kuntz .............................. 141/65 |
| 7,213,621 B1 | * | 5/2007 | Chang ............................ 141/86 |

* cited by examiner

*Primary Examiner* — Timothy L Maust
*Assistant Examiner* — Timothy P Kelly
(74) *Attorney, Agent, or Firm* — Donn K. Harms

(57) ABSTRACT

Vehicle fuel removal system for vehicles raised upon a automotive lift or driven over a automotive work pit. The device features a piercing spear member with engagement to a hydraulically translating member of smaller diameter for piercing the fuel tank. The small diameter member acts to allow flow of fluid around the spear head and down along the small diameter translating member. The hole produced by the piercing spear tip can be adapted to allow the insertion of a bung (where required). This assembly is surrounded by a funneling basin to direct fuel flow to a receiving hose. The described members can be engaged upon a rolling support or on an arm of a pivoting wall mounted support.

A residual fuel removal system from the fuel tanks of vehicles raised upon a automotive lift or driven over a automotive work pit. The device features a piercing spear member operatively engaged to a hydraulically powered translating member of smaller diameter for piercing the fuel tank. The small diameter member acts to allow flow of fluid around the spear head and down along the small diameter translating member. The hole produced by the piercing spear tip can be adapted to allow the insertion of a bung (where required). This assembly is surrounded by a funneling basin to direct fuel flow to a receiving hose. The described members can be engaged upon a rolling support or on an arm of a pivoting wall mounted support.

19 Claims, 3 Drawing Sheets

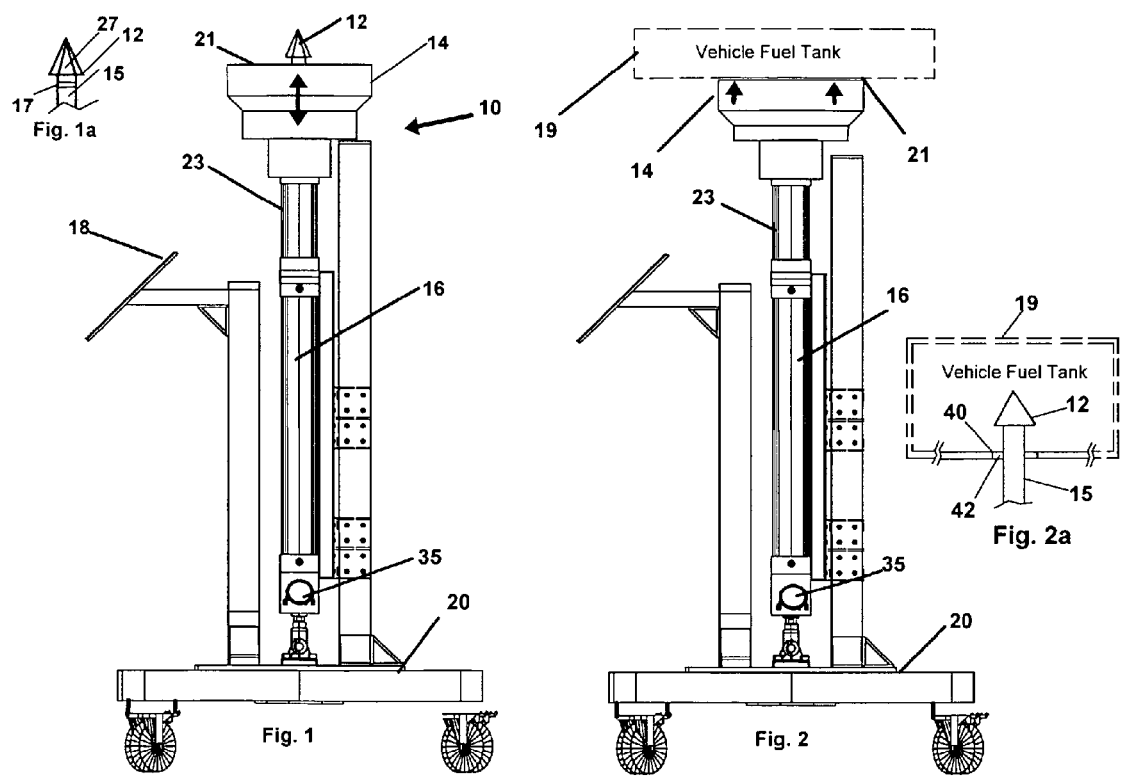

FUEL RECOVERY SYSTEM AND METHOD

BACKGROUND OF THE INVENTION

1. Field of the Invention

This disclosed device relates to reclamation of liquid fuels such as gasoline or diesel fuel. More particularly it relates to a method and device for recapturing fuel from the fuel tanks of vehicles undergoing the salvaging process in vehicle salvage yards. In particular, it relates to a device providing a safe and efficient reclamation of liquid fuels from mounted fuel tanks of vehicles being salvaged.

2. Prior Art

With the advent of the automobile, an industry was soon thereafter initiated to salvage parts and metals and other materials and components from motor vehicles. Every year there are thousand of vehicles driven, hauled, or dragged to salvage yards, some still with usable parts and surprisingly unused fuel as well.

Salvage yards modernly employ elaborate systems to keep track of individual vehicles as well as all usable parts in vehicles in their inventory to maximize profits on these individual parts. Unbroken windshields, exhaust systems, light assemblies, and transmissions are just a few examples of recyclable and reusable parts taken from junked vehicles.

Motor vehicle salvage is growing due to the need for newer and cleaner burning fuels and more efficient engines and means of travel. As a consequence, more and more, older vehicles are being scrapped and salvaged at salvage yards.

Most, if not all of these vehicles, upon arrival at a conventional wrecking yard or salvage facility, have tanks containing petroleum fuels such as gasoline and diesel. In past years, the contents of such tanks were simply dumped onto the ground causing extensive soil and groundwater pollution. Modernly, this type of behavior is highly illegal as in previous decades many acres of land have had to be excavated to remove harmful petroleum products from the soil.

Modern salvage yard owners, being attuned to environmental aspects and legal requirements, have made great strides in preventing intentional and accidental spillage of fuel tank contents onto the soil. In their efforts to maintain a clean environment, and to abide by environmental regulations, large quantities of fuels have been required for collection from the vehicles in such salvage yards. Due to stringent laws and regulations on pollution and fire hazards, collection of these liquid fuels is one of the first items of business when a new salvage vehicle reaches the salvage yard. Any vehicle with a tank is conventionally inspected for fuel contents which if found, must be removed so as to prevent any accidental spillage and fire hazards. This is done generally before a vehicle is placed into inventory in the yard with others.

It has been ascertained, that the environmental requirements can actually be profitable if handled to collect usable fuels such as gasoline and diesel in quantities that may be recycled. In today's market of high gas and oil prices and need for alternative fuels, methods of preventing fuel waste and pollution have evolved from being important to being profitable as well.

For salvage yards though, the primary profit comes from the resale of car parts and not necessarily the left over gas and oil. Since labor is the largest cost for most salvagers, minimizing the required labor to remove fuels and abide by environmental regulations, helps maximize their profits on the parts themselves.

Previous systems have not provided any means or method to efficiently extract fuels from tanks, prior to storage, crushing, or disassembly of vehicles and to concurrently avoid spills and chance of fire, and allow for the sealing of drained tanks if required by law. As a consequence, there is no widely used system or device adapted specifically to remove unused gas from gas tanks of salvaged vehicles efficiently and in a fashion where it may be easily recycled. Many salvage yards still remove the tank by hand, using wrenches to remove them and a screwdriver for puncturing with a hammer. Collection of fuel is by hand and employs a bucket or drum. This is both inefficient and labor intensively costly.

Other than removal by hand, using costly labor, it is known that the siphon principal can be employed with a simple tube set in the fuel tank to effectively remove fuel. But it can be noted that such a process is often not employed easily on the first attempt and the chance of ingesting harmful chemicals is greatly abundant. Also, once the siphon has started, often fluid is lost when transferring from the users mouth or a pump, to a receptacle. Therefor this method is not only undesirable, in an environmental point of view but also from a salvage yard owner's point of view, due to the danger imposed upon it's employee.

It has also been known that the dangers of a siphon can be averted by the use of a pump system. U.S. Pat. No. 1,582,399 to Helander teaches of a manually operated pump in which siphonic flow is started. Although the dangers of self siphoning have been averted there still requires the labor of pumping. Also, siphoning is mainly done from the side of the vehicle through the gas fill door therefor any other work to be done underneath the car must be halted.

Salvaged vehicles do not need to retain an intact fuel tank (unless of course the fuel tank is to be salvaged) so the use of non-intrusive methods of fluid removal only add more work and in turn costs. A punctured hole can obtain the same results. Since much of the salvage work done in a salvage yard is completed when the vehicle is raised on a automotive lift or driven over an automotive work pit where ample space is provided, it is economically more viable to remove the fuel when the vehicle is in this arrangement to allow for other work to be done during the draining period.

U.S. Pat. No. 5,375,862 to Sirianno teaches a device for receiving fluids from vehicles with employment of a funnel engaged upon a rolling platform where a receptacle is placed under to collect fluid and later be removed. This device does not employ any method of piercing a tank to retrieve the fluid of a completely enclosed tank, and instead relies upon a draining plug (which modern tanks do not employ), or requires the user to create a hole such as with a hammer and screwdriver. Concurrently, they must carefully place the collection device under the spewing hole they create. Although the device includes a manually operated height adjustment screw, this method is neither fast nor convenient for large changes in height.

U.S. Pat. No. 4,230,002 to Skidmore teaches a two in one oil pan plug remover and funnel for used oil collection. This device, similar to Sirianno requires the presence of a removable plug which many modern vehicles lack. Neither does Skidmore provide any method of translating a collection funnel to varying heights to capture fuel.

As such, there is a continuing unmet need for an improved device and system of easily engaged components, which will allow for the removal of fluids, from tanks with and lacking drainage apertures, from a salvaged vehicle fuel tank in an efficient and safe manner. Such a device should employ minimal labor to reduce costs, as well as minimal time to reduce labor. Further, such a device should provide for concurrent opening of the tank at a lower end and collection so as to avoid spilling. Finally, such a system should provide a means to route the collected fuels from small tanks to a reservoir where it may be collected and recycled by larger transporting tankers.

SUMMARY OF INVENTION

The device herein provides a solution to the above noted shortcomings in the prior art. The applicant's device provides a user with a manner to drain and recapture fuel from a vehicle's fuel tank in a safe and efficient manner and in various embodiments may be portable or permanently mounted depending on the intended use. The device features a spear tipped member that is engaged upon a hydraulically or other powered vertically translating shaft member, which is generally of a smaller diameter than the spear.

In operation, as the hydraulically translating member is forced upward, the spear, at its tip, is punched through the bottom of an automobile fuel tank. The spear is pushed above the wall forming the gas tank bottom, and the underlying translating member of smaller diameter enters the aperture formed by the spear and allows a flow of fluid in the gap between the aperture and the member and alternatively through a hollow axial chamber in the translating member. The fluid, which in this case is gas or diesel fuel, flows through the punched hole into a fluid receiver shown as bowl or funnel-like component directly below it.

Fluid reaching the fluid receiver is thereafter communicated to an outlet near the bottom of the fluid receiver, where a hose that leads to a fluid receptacle can be attached. The fluid receiver funnel can be immovably engaged upon a ridged member forming the exterior of the structure supporting the translating member such as the hydraulic cylinder itself. Alternatively, it may be coupled coaxially with the shaft member and ascend and descend with it, or at different times depending on the coaxial shaft configuration. If ascending concurrently, the fluid receiving funnel will be positioned on the shaft member in a position behind the spear during travel, to allow full penetration of the spear into the fuel tank without contacting the leading edge of the fluid receiver into the tank as well. The leading edge of the fluid receiver may be flexible or have a seal to help maintain fluid therein during draining. Fluid flowing into the fluid receiver, is communicated to a storage tank using a conduit therebetween.

In one preferred mode of the disclosed device the aforementioned components are engaged upon a portable rolling cart or platform. This allows the user to easily position the device under a raised vehicle to spear and sealably engage with the gas tank, as well as quickly remove the device after the fuel is recaptured. This allows for the use of one such device in a work space where multiple vehicles need to be worked on and the sharing of equipment is cost effective.

Often, vehicle garages, wrecking yards, and work/staging areas can be quite cluttered and adding another piece of equipment just continues to build this clutter. Another mode of the disclosed device employ a wall mounted system which is moveable along with the hydraulics, spear, and fluid receiver funnel housing is employed on a wall mounted system. Though this system limits the range of use of the device within a garage area, the space saving aspect may prove more desirable.

With respect to the above description, it is to be understood that the invention is not limited in its application to the details of operation of the fuel recovery system nor the arrangement of the components or steps in the method set forth above or in the following descriptions or in the illustrations in the drawings. The various methods of implementation and operation of the disclosed fuel recovery system herein, are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefor, those skilled in the art will appreciate that the conception upon which this disclosure is based may readily be utilized as a basis for designing similar fuel recovery systems for carrying out the several purposes of the present invention. Therefor, the objects and claims herein should be regarded as including such equivalent constructions, steps, and methodology insofar as they do not depart from the spirit and scope of the present invention.

Further objectives of this invention will be brought out in the following part of the specification wherein detailed description is for the purpose of fully disclosing the invention without placing limitations thereon.

It is the object of this invention to provide the user with a safe and efficient manner for removing fuel from salvaged vehicles or vehicles of the like in a manner that is easily employed during the normal salvage operations required upon the vehicle.

BRIEF DESCRIPTION OF THE FIGURES

FIG. 1 is a view of the device herein disclosed mode of the present invention on a rolling cart system ready for employment to puncture a fuel tank.

FIG. 1a shows the pointed tip configured for puncturing the the bottom wall of a vehicle fuel tank.

FIG. 2 illustrates the device translated to puncture a fuel tank with a funnel component in sealed communication with the tank and collecting drainage.

FIG. 2a shows a detailed view of the spear translated into the vehicle fuel tank.

FIG. 4 shows a close up view of the funnel component having a translatable member exiting within which is configured to engage the spear of FIG. 1a.

DETAILED DESCRIPTION OF THE PREFERRED EMBODIMENTS OF THE INVENTION

Figure 3:
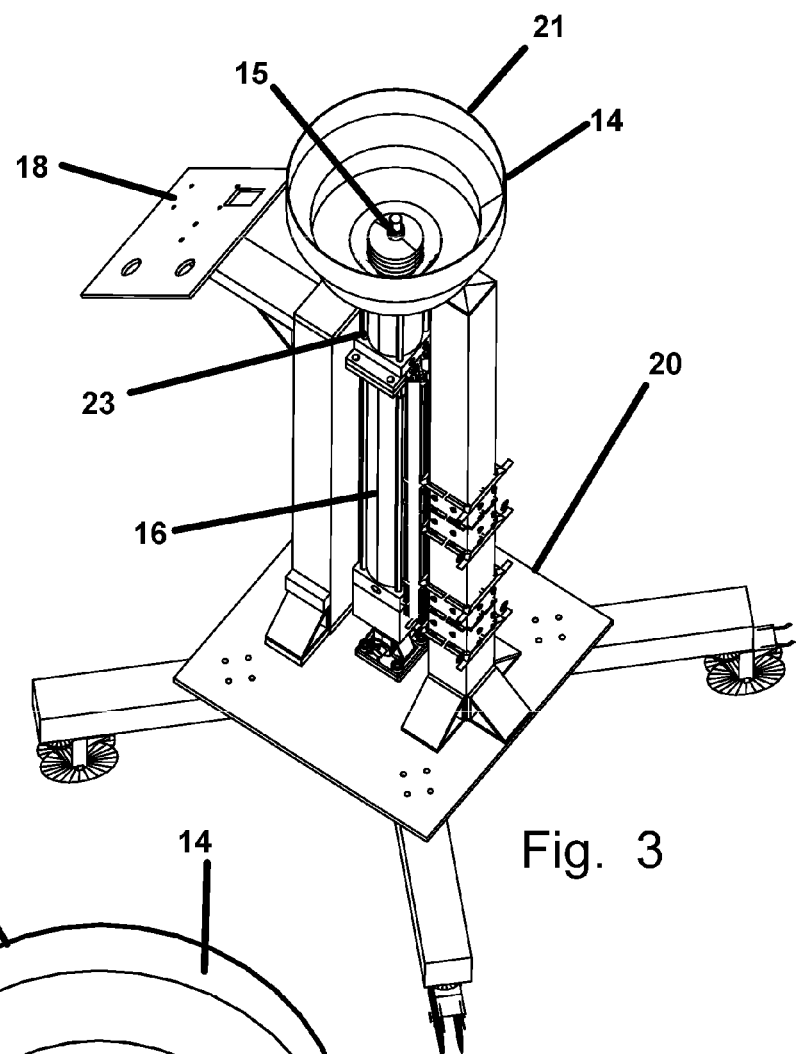
FIG. 3 depicts a perspective overhead view of the device showing the translating member engageable to the spear and the funnel component adapted to collect drainage and seal against the tank.

Referring now to the drawings of FIGS. 1-5, wherein similar components are identified by like reference numerals, which may appear in one or multiple drawings, there is seen in FIGS. 1-2 a mode of device 10 which is employable for accessing and draining the interior of vehicle fuel tanks during the wrecking or reclamation process of the vehicle. The device 10 is configured with piercing spear member 12 engaged to a hydraulic shaft member 15 which is translated within a surrounding funnel member 14 through the employment of means for powered translation such as a hydraulic cylinder component 16. The hydraulic cylinder component 16 is of conventional construction and is powered from a conventional source of hydraulic fluid pumping to gain mechanical advantage and force. The engagement of the spear 12 onto the hydraulic shaft member 15 may be permanent, or in an especially preferred mode, may be accomplished using means for removable engagement such as with a threaded engagement 17.

This particular mode of the device 10 is depicted on a rolling cart 20 where a control display area having a controller 18 is also depicted to allow the user to activate and control translation of the spear 12 by controlling the translation of the engaged hydraulic cylinder 15 to provide the force and movement to shaft member 15. The hydraulic cylinder 15 providing the force to the spear 12 by the communicating shaft member 15 is of sufficient power and capacity to translate the spear member 12 whereby it easily punctures a conventional metal or plastic vehicle fuel tank 19. Similarly the rolling cart system 20 is of appropriate material and construction to withstand the vertical forces necessary for puncture, and withdrawal of the spear 12.

A view of the draining position of the device 10 from the pre-deployment position of FIG. 1, shows the translation of the spear 12 to its engaged position of FIG. 2. The spear member 12 in FIG. 2, in the draining position, is fully penetrated into a vehicle fuel tank 19. Residual fuel in the fuel tank 19, once so punctured, will drain around and/or through an aperture 27 in the spear 12 engaged with the axial conduit in the hydraulic shaft member 15. The surrounding funnel component 14, may be formed of resilient material such as plastic or rubber at its leading end, so as to form a seal against the bottom of the fuel tank 19 and to catch draining fuel, and, to keep fuel which might cling to the tank surface from propagating outside the seal formed by the leading edge 21 of the funnel component 14. However, because the funnel component 14 has a circumference spaced a distance from the centered spear 12, it will in normal circumstances, or when employed for fuel tanks 19 having uneven lower surfaces, adequately catch and contain all fuel drained. As such it is envisioned, the device 10 may employ the funnel component 14 in both positions depending on the user's decision on how far to translate the spear 12 into the fuel tank 19. Further, if employed in a non contact manner with the fuel tank 19 as a regular course of use, the funnel component 14 may be formed of less resilient material such as hard plastic or metal, or may simply have a resilient seal affixed to its distal edge.

Shown in FIG. 2a, the spear 12 is pushed above the wall 38 forming the gas tank 19 bottom, and the underlying translating member 15 of smaller diameter enters the pierced aperture 40 formed by the spear 12 and allows a flow of fluid in the gap 42 between the aperture 40 and the member 12. The fluid, which in this case is gas or diesel fuel, flows through the punched aperture 40 into the funnel 14.

Figure 4:
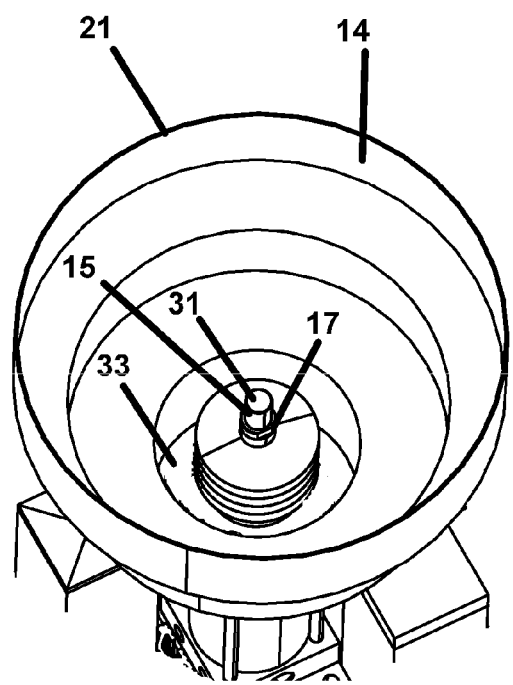

As can be seen in FIGS. 3 and 4, the distal end of the shaft member 15 may be adapted for removable engagement of a spear 12 so as to allow replacement. Alternatively the spear 12 may be engaged permanently to the shaft member 15 and both replaced as needed. However, if the spear 12 is removably engageable, it will allow the user to replace the spear 12 when worn, or replace the spear 12 from a kit of different sized and configured spears 12 so as to customize the device 12 to the job at hand. If in a kit, some spears 12 could have larger diameters at their widest point, and some smaller, along with other elements of customization. Additionally the hydraulic shaft 15 and engaged spear 12 may translate independently of the funnel component 14 or concurrently through the employment of a second hydraulic cylinder 15 operatively engaged to translate the exterior shaft member 23 coaxially engaged with the shaft member 15. The controls noted in FIGS. 1-3 would be adapted for dual control and thereby allow the seal to be accomplished before or after a piercing of the tank 19 by the spear 12.

Drainage and communication of fuel from the tank 19 is accomplished through a drain conduit such as a pipe or hose 36 which at a first end is in sealed communication with one or both of an axial passage 31 and drain passage 33 through the shaft member 23. At a second end the hose 36 is in sealed communication to a reservoir. An aperture 35 is shown as a current means for communicating fuel collected from the tank 19, to the hose 36 or other conduit leading to the reservoir which would also be of conventional construction such as a drum or tank.

Figure 5:
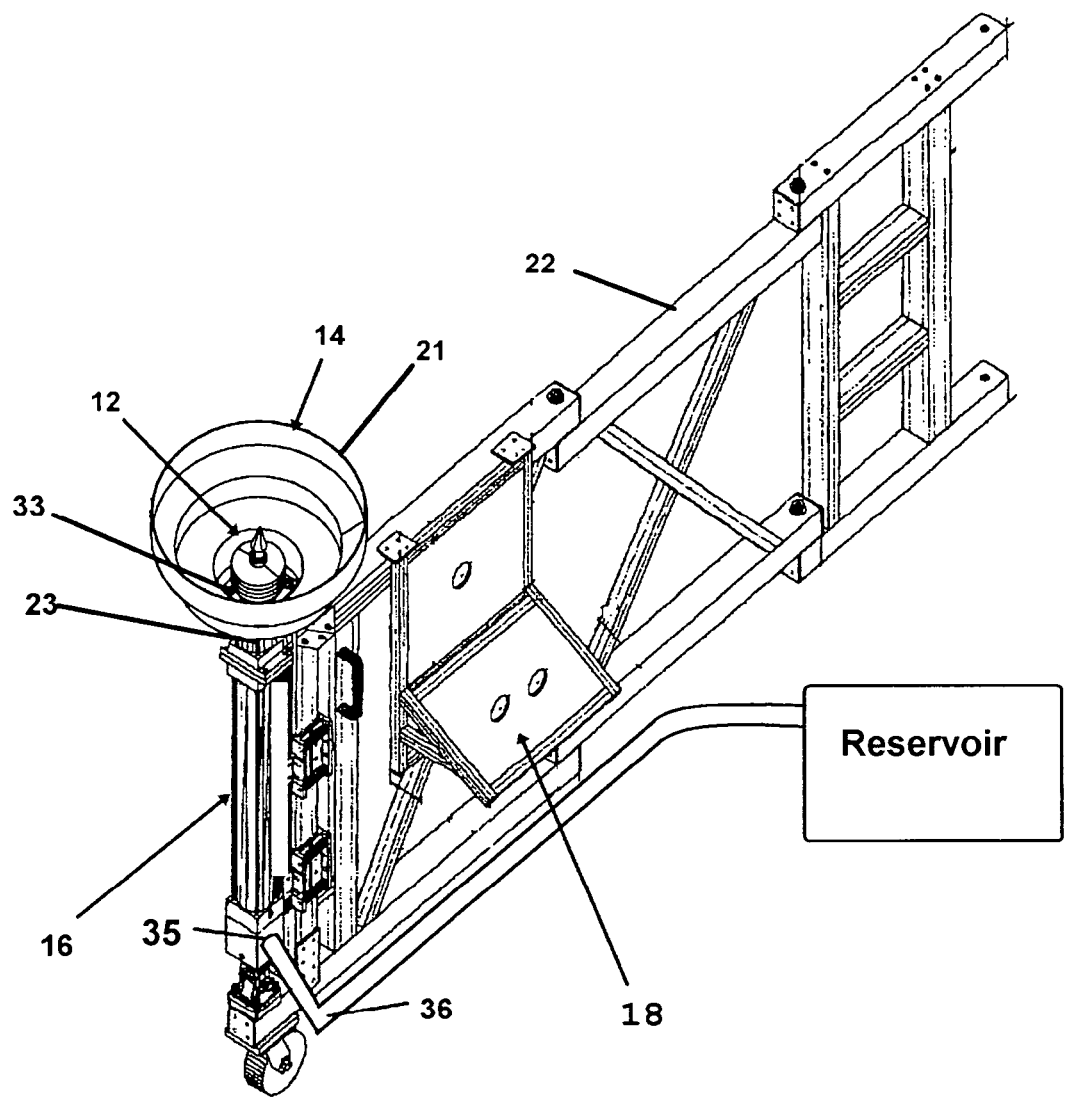
FIG. 5 illustrates the device engaged to a swinging arm system rather than the cart whereby drainage of collected fuel is directed along the arm to a storage reservoir.

While the rolling card mode of the device is easily deployed, another mode of disclosed device 10 is seen in FIG. 5 where components are engaged upon a fixed wall mounted system 22. Again the display control center 18 is depicted as part of the mounting system 22. Wall mount system 22 is of such material and construction to allow for rotational swinging of the device 10 from a stored position against a wall, to one underneath a raised vehicle easily and safely and can withstand all forces necessary to complete such actions.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An apparatus for removal of residual fuel from a vehicle fuel tank situated in a position above said apparatus, comprising:
    a means for puncturing a wall surface to form an aperture during a travel through and past said wall surface defining an interior cavity of said fuel tank holding fuel therein;
    a means to translate said means for puncturing at a force sufficient to form said aperture, said means to translate comprising:
        a hydraulic cylinder having a supply of pressurized fluid,
        an elongated member engaged at a first end to said hydraulic cylinder and at a second end to said means for puncturing,
        a controller for metering said pressurized fluid supply communicated to said hydraulic cylinder, and
        said controller programmed to control the translation of said means for puncturing during puncturing of said wall surface and said forming of said aperture in said wall surface;
    a means to catch said fuel exiting said interior cavity through said aperture; and
    a conduit in sealed communication between said means to catch said fuel, and a reservoir, whereby fuel exiting said interior cavity in a gravity flow is captured and communicated to said reservoir through said conduit.

2. The apparatus for removal of residual fuel of claim 1, additionally comprising:
    said means for puncturing the wall surface comprising a spear head, said spear head having a substantially pointed first end and a trailing end opposite said first end, said trailing end having a circumference larger than that of said first end;

said trailing end is engaged to said means to translate; and whereby the translation of said spear head in a direction toward and through said wall surface causes said first end to puncture said wall surface, thereby forming said aperture, said aperture defined by an aperture edge which is sized equal to or slightly larger than said circumference of said trailing end, during the translation of said trailing end through said wall surface and into said interior cavity.

3. The apparatus for removal of residual fuel of claim 1, additionally comprising:

said means to catch said fuel comprising a pan having a horizontally disposed bottom surface and a sidewall extending vertically from said bottom surface in a direction toward said means for puncturing;

said sidewall extending a distance to a distal edge of said sidewall above said bottom surface; and said conduit in a sealed engagement between said pan and said reservoir, whereby fuel exiting said interior cavity in a gravity flow is captured in said pan and communicated to said reservoir through said conduit.

4. The apparatus for removal of residual fuel of claim 2, additionally comprising:

said means to catch said fuel comprising a pan having a horizontally disposed bottom surface and a sidewall extending vertically from said bottom surface in a direction toward said means for puncturing;

said sidewall extending a distance to a distal edge of said sidewall above said bottom surface; and said conduit in a sealed engagement between said pan and said reservoir, whereby fuel exiting said interior cavity in a gravity flow is captured in said pan and communicated to said reservoir through said conduit.

5. The apparatus for removal of residual fuel of claim 2 further comprising:

said elongated member having a circumference sized less than that of said trailing end of said spear head thereby forming a gap between an exterior surface of said member and a perimeter defining said aperture; and said gap providing a passage for a gravity draining of said fuel through said wall surface.

6. The apparatus for removal of residual fuel of claim 3 further comprising:

said second end of said elongated member having a circumference smaller than a widest point of said means for puncturing;

a said puncturing of said wall surface forming said aperture having a circumference substantially equal to said widest point of said means for puncturing; and a gap between said elongated member and said circumference of said aperture and an exterior surface of said elongated member when communicating through said aperture, said gap providing a passage for said fuel to said pan.

7. The apparatus for removal of residual fuel of claim 4 further comprising:

said second end of said elongated member having an exterior circumference smaller than said circumference of said trailing end of said spear head; and a gap formed between said member exterior circumference when extending through said aperture, and said edge of said aperture.

8. The apparatus for removal of residual fuel of claim 2, additionally comprising:

a means for removable engagement of said spear head to said means to translate said means for puncturing; and a plurality of spear heads, each employable with said means for removable engagement, whereby said spear head may be replaced with one of said plurality of spear heads through an employment of said means for removable engagement.

9. The apparatus for removal of residual fuel of claim 4, additionally comprising:

a means for removable engagement of said spear head to said means to translate said means for puncturing; and a plurality of spear heads, each employable with said means for removable engagement, whereby said spear head may be replaced with one of said plurality of spear heads through an employment of said means for removable engagement.

10. The apparatus for removal of residual fuel of claim 5, additionally comprising:

a means for removable engagement of said spear head to said second end of said elongated member; and a plurality of spear heads, each employable with said means for removable engagement, whereby said spear head may be replaced with one of said plurality of spear heads through an employment of said means for removable engagement.

11. The apparatus for removal of residual fuel of claim 7, additionally comprising:

a means for removable engagement of said spear head to said second end of said elongated member; and a plurality of spear heads, each employable with said means for removable engagement, whereby said spear head may be replace with one of said plurality of spear heads through an employment of said means for removable engagement.

12. The apparatus for removal of residual fuel of claim 3, additionally comprising:

a means to translate said pan toward said fuel tank to form a seal between said wall surface and said pan, with said seal surrounding said aperture once formed; and said seal preventing said fuel exiting said fuel tank through said aperture from flowing across said wall surface past said seal.

13. The apparatus for removal of residual fuel of claim 6, additionally comprising:

a means to translate said pan toward said fuel tank to form a seal between said wall surface and said pan, with said seal surrounding said aperture once formed; and said seal preventing said fuel exiting said fuel tank through said aperture from flowing across said wall surface past said seal.

14. The apparatus for removal of residual fuel of claim 4, additionally comprising:

a means to translate said pan toward said fuel tank to form a seal between said wall surface and said pan, with said seal surrounding said aperture once formed; and said seal preventing said fuel exiting said fuel tank through said aperture from flowing across said wall surface past said seal.

15. The apparatus for removal of residual fuel of claim 7, additionally comprising:

a means to translate said pan toward said fuel tank to form a seal between said wall surface and said pan, with said seal surrounding said aperture once formed; and said seal preventing said fuel exiting said fuel tank through said aperture from flowing across said wall surface past said seal.

16. The apparatus for removal of residual fuel of claim 9, additionally comprising:

a means to translate said pan toward said fuel tank to form a seal between said wall surface and said pan, with said seal surrounding said aperture once formed; and said seal preventing said fuel exiting said fuel tank through said aperture from flowing across said wall surface past said seal.

17. The apparatus for removal of residual fuel of claim 11, additionally comprising:

a means to translate said pan toward said fuel tank to form a seal between said wall surface and said pan, with said seal surrounding said aperture once formed; and said seal preventing said fuel exiting said fuel tank through said aperture from flowing across said wall surface past said seal.

18. The apparatus for removal of residual fuel of claim 17 additionally comprising:

a wheeled platform for rolling said pan to a position adjacent to said wall surface of a fuel tank to be drained, whereby said means to translate said means for puncturing extends substantially vertically from said wheeled platform.

19. The apparatus for removal of residual fuel of claim 13 additionally comprising:

a wheeled platform for rolling said pan to a position adjacent to said wall surface of a fuel tank to be drained, whereby said means to translate said means for puncturing extends substantially vertically from said wheeled platform.

* * * * *